(12) United States Patent
Gschwind et al.

(10) Patent No.: US 9,354,947 B2
(45) Date of Patent: *May 31, 2016

(54) LINKING A FUNCTION WITH DUAL ENTRY POINTS

(71) Applicant: International Business Machines Corporation, Armonk, NY (US)

(72) Inventors: Michael Karl Gschwind, Chappaqua, NY (US); Ulrich Weigand, Holzgerlingen (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/525,680

(22) Filed: Oct. 28, 2014

(65) Prior Publication Data

US 2016/0117201 A1 Apr. 28, 2016

(51) Int. Cl.
*G06F 9/54* (2006.01)
*G06F 9/46* (2006.01)

(52) U.S. Cl.
CPC . *G06F 9/54* (2013.01); *G06F 9/466* (2013.01)

(58) Field of Classification Search
CPC .................................... G06F 9/54; G06F 9/466
See application file for complete search history.

(56) References Cited

U.S. PATENT DOCUMENTS

| 5,797,014 | A | | 8/1998 | Gheith | |
|---|---|---|---|---|---|
| 5,845,118 | A | * | 12/1998 | Gheith | .................... G06F 8/447 717/120 |
| 6,317,870 | B1 | * | 11/2001 | Mattson, Jr. | .......... G06F 9/4425 712/E9.082 |
| 6,817,014 | B2 | | 11/2004 | Hundt et al. | |
| 7,299,462 | B2 | | 11/2007 | Shann et al. | |
| 9,021,511 | B1 | * | 4/2015 | Gschwind | ................. G06F 8/70 717/162 |
| 9,146,715 | B1 | * | 9/2015 | Gschwind | ................. G06F 8/41 |
| 2003/0135848 | A1 | * | 7/2003 | Krishnan | ............... G06F 9/4426 717/158 |
| 2008/0126742 | A1 | | 5/2008 | Shupak et al. | |
| 2008/0288919 | A1 | | 11/2008 | Hodges et al. | |
| 2013/0263153 | A1 | | 10/2013 | Gschwind | |

OTHER PUBLICATIONS

Gschwind et al., "Linking a Function with Dual Entry Points," U.S. Appl. No. 14/570,010, filed Dec. 15, 2014.
Gschwind et al., "Selection of an Entry Point of a Function Having Multiple Entry Points," U.S. Appl. No. 14/501,127, filed Sep. 30, 2014.
Gschwind et al., "Selection of an Entry Point of a Function Having Multiple Entry Points," U.S. Appl. No. 14/569,974, filed Dec. 15, 2014.

(Continued)

*Primary Examiner* — Syed Roni
(74) *Attorney, Agent, or Firm* — Richard A. Wilhelm; Steven L. Bennett

(57) ABSTRACT

A method for a static linker to resolve a function call can include identifying, during link time, a first function call of a calling function to a callee function, determining whether the callee function is a local function, determining whether the callee function has a plurality of entry points, and whether an entry point of the plurality of entry points is a local entry point. The method can include resolving, during link time, the first function call to enter the local entry point, which can include replacing a symbol for the function in the first function call with an address of the local entry point during link time. If the callee function cannot be determined to be a local function, the method can include generating stub code and directing the first function call to enter the stub code during link time.

9 Claims, 7 Drawing Sheets

(56) References Cited

OTHER PUBLICATIONS

Gschwind et al., "Rewriting Symbol Address Initialization Sequences," U.S. Appl. No. 14/527,819, filed Oct. 30, 3014.
Gschwind et al., "Rewriting Symbol Address Initialization Sequences," U.S. Appl. No. 14/570,000, filed Dec. 15, 2014.
List of IBM Patents or Patent Applications Treated as Related.
Modra, A., "[Patch 2/9] Change plt stubs to have destination in r12", Message 373, Oct. 30, 2013. Grace Period Disclosure. https://sourceware.org/ml/binutils/2013-10/msg00373.html.
Modra, A., "[Patch 4/9] Add ELFv2 .localentry support", Message 375, Oct. 30, 2013. Grace Period Disclosure. https://sourceware.org/ml/binutils/2013-10/msg00375.html.
Modra, A., "[Patch 5/9] ELFv2 stub, plt and link changes", Message 376, Oct. 30, 2013. Grace Period Disclosure. https://sourceware.org/ml/binutils/2013-10/msg00376.html.
Modra, A., "[Patch 9/9] PowerPC64 ELFv2 support for gold", Message 380, Oct. 30, 2013. Grace Period Disclosure. https://sourceware.org/ml/binutils/2013-10/msg00380.html.
Modra, A., Edit ELFv2 global entry prologue to non-PIC, Message 20, Nov. 4, 2013. Grace Period Disclosure. https://sourceware.org/ml/binutils/2013-11/msg00020.html.
Weigand, U., "[Patch, rs6000] ELFv2 ABI 2/8: Remove function descriptors", Message 1141, Nov. 11, 2013. Grace Period Disclosure. https://gcc.gnu.org/ml/gcc-patches/2013-11/msg01141.html.
Weigand, U., "[Patch] Power PC64 ELFv2 ABI 2/6: Remove function descriptors", Message 315, Nov. 12, 2013. Grace Period Disclosure. https://sourceware.org/ml/libc-alpha/2013-11/msg00315.html.
Weigand, U., "[Patch] Power PC64 ELFv2 ABI 3/6: PLT local entry point optimization", Message 314, Nov. 12, 2013. Grace Period Disclosure. https://sourceware.org/ml/libc-alpha/2013-11/msg00314.html.

\* cited by examiner

LINKING A FUNCTION WITH DUAL ENTRY POINTS

STATEMENT REGARDING PRIOR DISCLOSURES BY THE INVENTOR OR A JOINT INVENTOR

The following disclosures are submitted under 35 U.S.C. 102(b)(1)(A): Messages 373 (2013-10), 375 (2013-10), 376 (2013-10), 380 (2013-10), and 20 (2013-11) posted to the GNU Binutils (assembler and linker) website (https://sourceware.org/ml/binutils) as mailing list messages. Message 1141 (2013-11) posted to the GCC (compiler) website (http://gcc.gnu.org/ml/gcc-patches) as a mailing list message. Messages 315 (2013-11) and 314 (2013-11) posted to the glibc (system library and dynamic loader) website (https://sourceware.org/ml/libc-alpha) as mailing list messages.

BACKGROUND

The present disclosure relates generally to computer systems, and more specifically, to a static linker configured to select between a plurality of entry points of a callee function when resolving a function call of a calling function.

In computer software, an application binary interface (ABI) describes the low-level interface between an application module and the operating system or between the application module and another application module. The ABI covers details such as data type, size, and alignment; the calling conventions which control how function arguments are passed and how return values are retrieved; the system call numbers and how an application should make system calls to the operating system; and in the case of a complete operating system ABI, the binary format of object files, program libraries, and so on. Several ABIs (e.g., the Interactive Unix ABI allows a wide range of programs to run on a variety of Unix and Linux variants for the Intel x86 architecture) allow an application program from one operating system (OS) supporting that ABI to run without modifications on any other such system, provided that necessary shared libraries are present, and similar prerequisites are fulfilled.

The program development cycle of a typical application program includes writing source code, compiling the source code into object files, building shared libraries, and linking of the object files into a main executable program. Additional preparation, including loading of the main executable program, and loading of the shared libraries for application start-up, occurs before the application is executed on a particular hardware platform.

The compiler works on a single source file (compile unit) at a time to generate object files. The compiler generates object code without knowing the final address or displacement of the code/data. Specifically, the compiler generates object code that will access a table of contents (TOC) for variable values without knowing the final size of the TOC or offsets/addresses of various data sections. Placeholders for this information are left in the object code and updated by the linker. A TOC is a variable address reference table that is utilized, for example in an AIX environment, to access program variables in a manner that supports shared libraries and is data location independent. A similar structure, referred to as a global offset table (GOT), performs a similar function (e.g., indirect and dynamically relocatable access to variables) in a LINUX environment. One difference between a TOC and a GOT is that a TOC may contain actual data, where a GOT only contains addresses (pointers) to data. In the Linux PowerPC 64-bit environment the TOC contains the GOT section plus small data variables.

A static linker combines one or more separately compiled object files derived from distinct source files into a single module, and builds a single GOT and/or TOC for the module that is shared by files in the module. An executing application includes at least one module, a statically linked module typically containing the function main( ) as well as, optionally, several other functions, sometimes also known as the main module. Some applications may be statically linked, that is, all libraries have been statically integrated into the main module. Many applications also make use of shared libraries, sets of utility functions provided by the system or vendors to be dynamically loaded at application runtime and where the program text is often shared between multiple applications.

Each module in a computer program may have a different TOC pointer value. The TOC register or GOT register (referred to hereinafter as the TOC register) may therefore be saved and restored for each function call, either by a procedure linkage table (PLT) stub code segment, or by the callee function in conventions where the TOC register is treated as a preserved (i.e., callee-saved) register.

SUMMARY

Various embodiments are directed to a computer-implemented method for a static linker to resolve a function call. The method can include identifying, during link time, a first function call of a calling function to a callee function and determining whether the callee function is a local function. In response to determining that the callee function is a local function, the method can include determining whether the callee function has a plurality of entry points and whether an entry point of the plurality of entry points is a local entry point. When it is determined that the callee function has a plurality of entry points and that an entry point of the plurality of entry points is the local entry point, the method can include resolving, during link time, the first function call to enter the local entry point. The resolving of the first function call to enter the local entry point can include replacing a symbol for the function in the first function call with an address of the local entry point during link time. If the callee function cannot be determined to be a local function, the method can include generating stub code and directing the first function call to enter the stub code during link time.

Various additional embodiments are directed to a system and computer program product for a static linker to resolve a function call.

BRIEF DESCRIPTION OF THE SEVERAL VIEWS OF THE DRAWINGS

The subject matter which is regarded as embodiments is particularly pointed out and distinctly claimed in the claims at the conclusion of the specification. The forgoing and other features, and advantages of the embodiments are apparent from the following detailed description taken in conjunction with the accompanying drawings in which:

DETAILED DESCRIPTION

Figure 1:
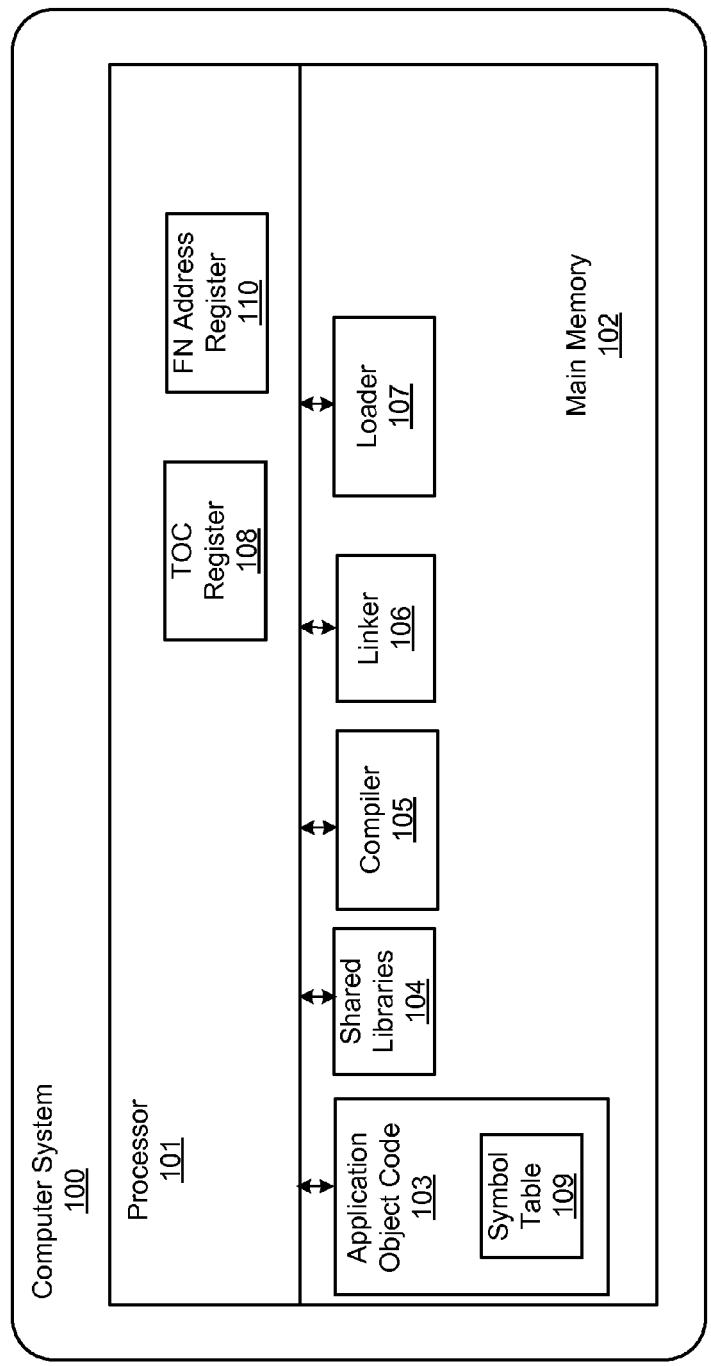
FIG. 1 depicts an example of a computer system having a static linker in which various embodiments can be implemented.

In various embodiments, a static linker is configured to select between a plurality of entry points of a callee function when resolving a function call of a calling function. Each function in application object code may have a plurality of entry points inserted by, for example, a compiler. The entry points may be inserted at certain locations within the function for different reasons. Entry points may be used to enter a callee function at a certain point within the code of the callee function, which may skip parts of the code within the function.

The static linker may select which entry point of the callee function to enter at the time various modules are statically linked, i.e., at "link time." When executing the executable program, a calling function of the program may perform a call to a callee function. The callee function may have a plurality of entry points. The plurality of entry points may include a global entry point and a local entry point. The global entry point may be positioned before the local entry point and instructions may separate the two entry points. The instructions may perform a TOC pointer value calculation and load the calculated TOC pointer value into the TOC register for the callee function. If a calling function is local to the callee function, the TOC instructions need not be performed because local functions share the same TOC pointer value in a TOC register. The static linker may identify a function call in the calling function. The static linker may determine that the function call is a local function call where the calling function and the callee function share the same TOC pointer value. The static linker may refer to a symbol table to determine whether the callee function has a plurality of entry points and whether an entry point of the plurality of entry points is a local entry point. If there are a plurality of entry points and one of the entry points is a local entry point, then the static linker may resolve a symbol associated with the function call so that the callee function is entered at the local entry point via a direct call. Entering the callee function at the local entry point suppresses the generation of TOC pointer save and restore commands that are performed when the callee function is entered at a global entry point (used for external function calls and calls that cannot be determined to be local calls). Resolving the symbol so that the callee function is entered at the local entry point reduces the cost on processor resource usage by avoiding generation of unnecessary TOC save and restore commands and skipping unnecessary TOC computation instructions.

In various embodiments, an example of a function with a plurality of entry points within a function is a dual entry point function that includes a global entry point and a local entry point. The global entry point, accompanied by prologue code, and a local entry point may be inserted at the beginning of each function in application object code by, for example, a compiler. The prologue code can include instructions for initializing a TOC pointer in register R2, creating a stack frame, saving nonvolatile registers used by the function, as well as saving in limited access bits used by the function. During runtime, entry into a callee function at the global entry point may trigger the prologue code, which calculates and loads a table of contents (TOC) pointer value in the TOC register for the callee function. Entry into the callee function at the local entry point may skip the TOC-related portion of the prologue code, and the calling function provides the TOC pointer value for the callee function in the TOC register. Different types of function calls (i.e., local and direct, external and direct, or indirect) may use different entry points into a callee function. The calculation of the TOC pointer value for the callee function and loading the TOC pointer value into the TOC register may be performed based on a value that is stored in a function address register, which may be R12 in some embodiments. The TOC register may be R2 in some embodiments. The numbering of the registers may be in accordance with the Power instruction set architecture (ISA), however, other ISAs—for Power, or another computer architecture—may define other processor registers.

A function call in application object code is either local or external, and also either direct or indirect. For a local function call, from a calling function to a callee function that is in the same module as the calling function, the TOC pointer value is generally the same for the calling function and the callee function. (Some modules may have two or more pointer values, with various functions within the module having their own TOC pointers. A call to a function in the same module made from a location in the module with a different TOC pointer than the pointer for the function is treated herein as an extern call.) For an external function call, from a calling function to a callee function that is in a different module from the calling function, the TOC pointer value is different for the calling function and the callee function. Whether a function call is local or external is determined at resolution time, which may occur at various times, e.g., at compile time, link time, or load time (i.e. run time). When the type of a function call is resolved, a branch to the appropriate entry point (i.e., local or global) may be inserted in conjunction with the function call. Whether a function call is direct or indirect is indicated in the source code. A direct function call refers to the callee function by its symbol, or name. An indirect function call refers to the callee function by a function pointer which holds a value of an address corresponding to the callee function; the value of the function pointer may change during execution of the application object code.

For a direct, local function call, the calling function provides the TOC pointer value for the callee function in the TOC register; therefore, for a direct, local function call, the local entry point into the callee function is used. For a direct, external function call, the calling function does not know the TOC pointer value for the callee function; therefore, for a direct, external function call, the global entry point into the callee function is used. For an indirect function call, it is not known in advance whether the function call will be local or external; therefore, for an indirect function call, the global entry point into the callee function is also used. In further embodiments, if a callee function does not require a TOC, regardless of the type of the function call, the local entry point into the callee function is used.

In various embodiments, when making a direct call to a callee function, the linker and the compiler may not know whether the direct call is to a local function or a global function. Therefore, a compiler may insert a placeholder for a store and restore of the calling function's TOC pointer value when a call to the callee function is made. The linker may insert a call to a PLT stub code at the call site of the calling function to the callee function because the linker will assume the function is a global function when the type of function is unknown, i.e., the callee function cannot be determined to be a local function. In addition, the linker may insert this call to a PLT stub code if the symbol is required to be resolved at runtime in accordance with an ABI, e.g., because an ABI may specify that some symbols (in the most extreme case, all globally visible symbols) must be resolved at runtime. The PLT stub may save the TOC pointer value for the calling function within a stack frame and the stub may be directed to the global entry point address of the callee function. This is to ensure the prologue code is executed in the callee function, which calculates and loads the TOC pointer value for the callee function in the TOC register. However, if the call is actually a local call to a local function, the calculation and saving of the TOC pointer value is unnecessary and uses processing resources to complete. In various embodiments, the loader may determine whether the call is a global call or a local call and may redirect the PLT stub to a local entry point when the call is determined to be local. In various embodiments, the linker may be able to determine that a function call is a local function call before runtime, such as during link time. If the linker determines that a call is to local function with certainty, there are a plurality of entry points, and an entry point is a local entry point, then the linker may resolve the function call to enter at the local entry point of the callee function. No PLT stub is created and the TOC pointer value calculation and load commands are skipped in the callee function.

FIG. 1 illustrates an embodiment of a computer system 100 having a static linker 106 that is configured to select one of a plurality of entry points in a callee function when resolving a function call of a calling function. Computer system 100 comprises a processor 101 and a main memory 102. Application object code 103, which is generated from program source code (not shown) by a compiler, such as compiler 105, includes a plurality of functions, and is stored in main memory 102 for execution by processor 101. The application object code 103 may be generated by a compiler that is located on a different computer system from computer system 100. Application object code 103 may include a symbol table 109, which may be generated by the compiler 105 when the application object code 103 is generated. The symbol table 109 may include a data structure that associates each identifier (i.e., function and variable names) in a program's source code with information relating to its declaration or appearance in the source code, such as type, scope level, and/or location. The symbol table 109 may also indicate that a function has a plurality of entry points, whether the entry points are local and global entry points, and the distance between the two entry points. The symbol table and its symbol information is further described herein. Shared library code 104 may include functions that are external to application object code 103 and that may be called during execution of application object code 103 via external function calls (i.e., calls to functions in other modules and also referred to herein as global function calls).

The loader 107 may include runtime components that perform linking. The static linker 106 links the application object code 103 before the application object code 103 is loaded by the loader 107. The loader 107 may be referred to as herein as dynamic loader, dynamic linker, or a resolver. The static linker 106 or the loader 107 may be configured to determine an entry point of a function having a plurality of entry points. The function may be from the application object code 103 or the shared libraries 104.

TOC register 108 is located in processor 101. TOC register 108 stores a current value of a TOC pointer for the currently active function of application object code 103 or shared library code 104 (i.e., the function that is currently executing). The TOC register 108 may be general purpose register R2 in some embodiments. In further embodiments of a computer system, such as computer system 100, the TOC register 108 may store a GOT value instead of a TOC pointer value. Function address register 110 is also located in processor 101, and may hold an entry address for optional use in function linkage in a function call. Function address register 110 may be general purpose register R12 in some embodiments. In some embodiments, the computer system 100 may further comprise another object code module that is distinct from the application object code 103 and the shared library code 104, and the other object code module may also contain functions that are called by application object code 103 via external function calls.

Figure 2:
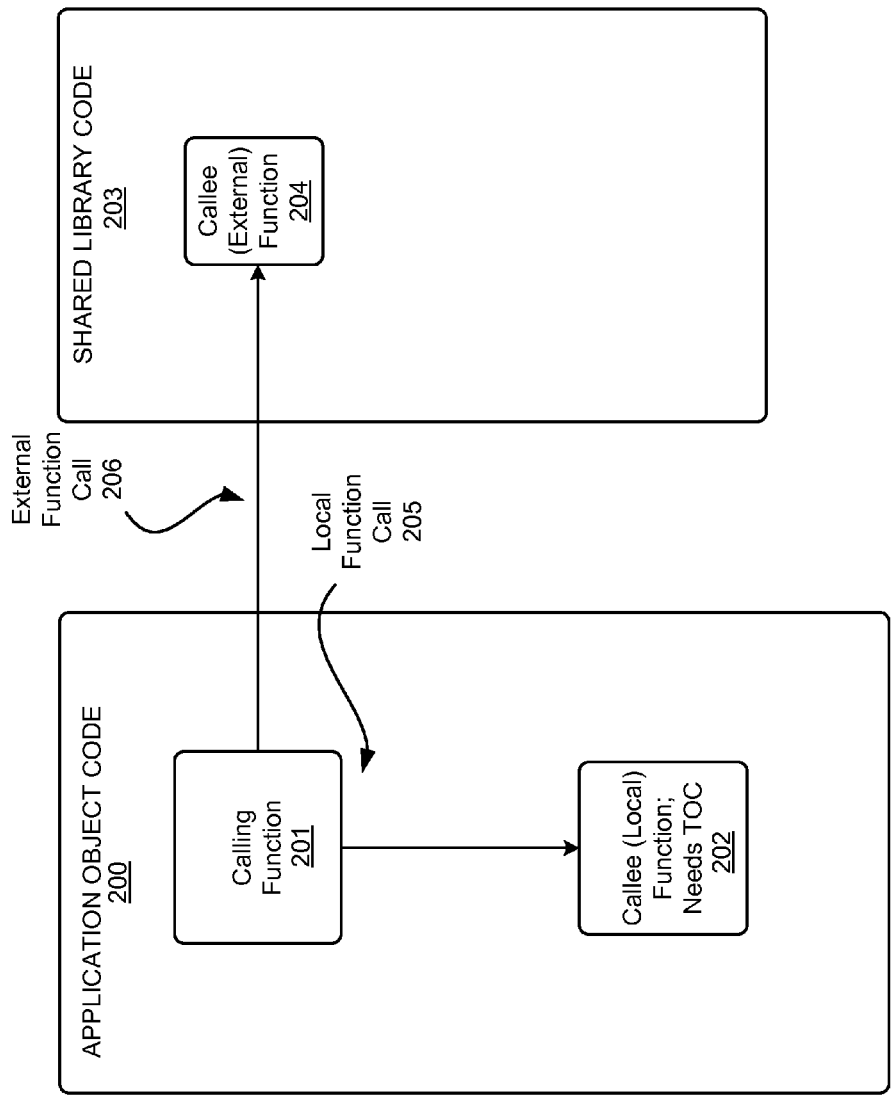
FIG. 2 depicts local and external function calls in accordance with an embodiment.

FIG. 2 illustrates an embodiment of a local function call 205 and an external function call 206. Application object code 200 may include application object code 103 of FIG. 1, and shared library 203 may include shared library code 104 of FIG. 1. Calling function 201 and callee function 202 are part of application object code 200, and callee function 204 is part of shared library 203. If the calling function 201 and the callee function 202 are both part of application object code 200, the callee function 202 is local to the calling function 201 and the call is a local function call 205. Therefore, the calling function 201 and the callee function 202 have the same TOC pointer value. If the calling function 201 is part of the application object code 200, and the callee function 204 is in the shared library 203, then the callee function 204 is external to the calling function 201 and the call is an external function call 206. Therefore, the calling function 201 and the callee function 204 may have different TOC pointer values.

When calling function 201 performs an external function call to callee function 204, and when execution passes from the calling function 201 to the callee function 204, then the value of the TOC pointer of the calling function 201 is saved from TOC register 108 to a stack frame corresponding to the calling function 201 in the runtime stack. Then, the TOC pointer value of callee function 204 is loaded into TOC register 108. When the callee function 204 exits and execution passes back to the calling function 201, the value of the TOC pointer of the calling function 201 is restored to the TOC register 108 from the stack frame corresponding to the calling function 201.

FIG. 2 is shown for illustrative purposes only; any number of functions may be included in application object code 200 and shared library 203, and these functions may call one another in any appropriate manner. In some embodiments, the computer system 100 may further comprise another object code module that is distinct from the application object code 103/200 and the shared library code 104/203, and the other object code module may also contain functions that are called by application object code 103/200 via external function calls such as external function call 206. There may also be local function calls between functions that are both within the same shared library code 104/203.

Figure 3:
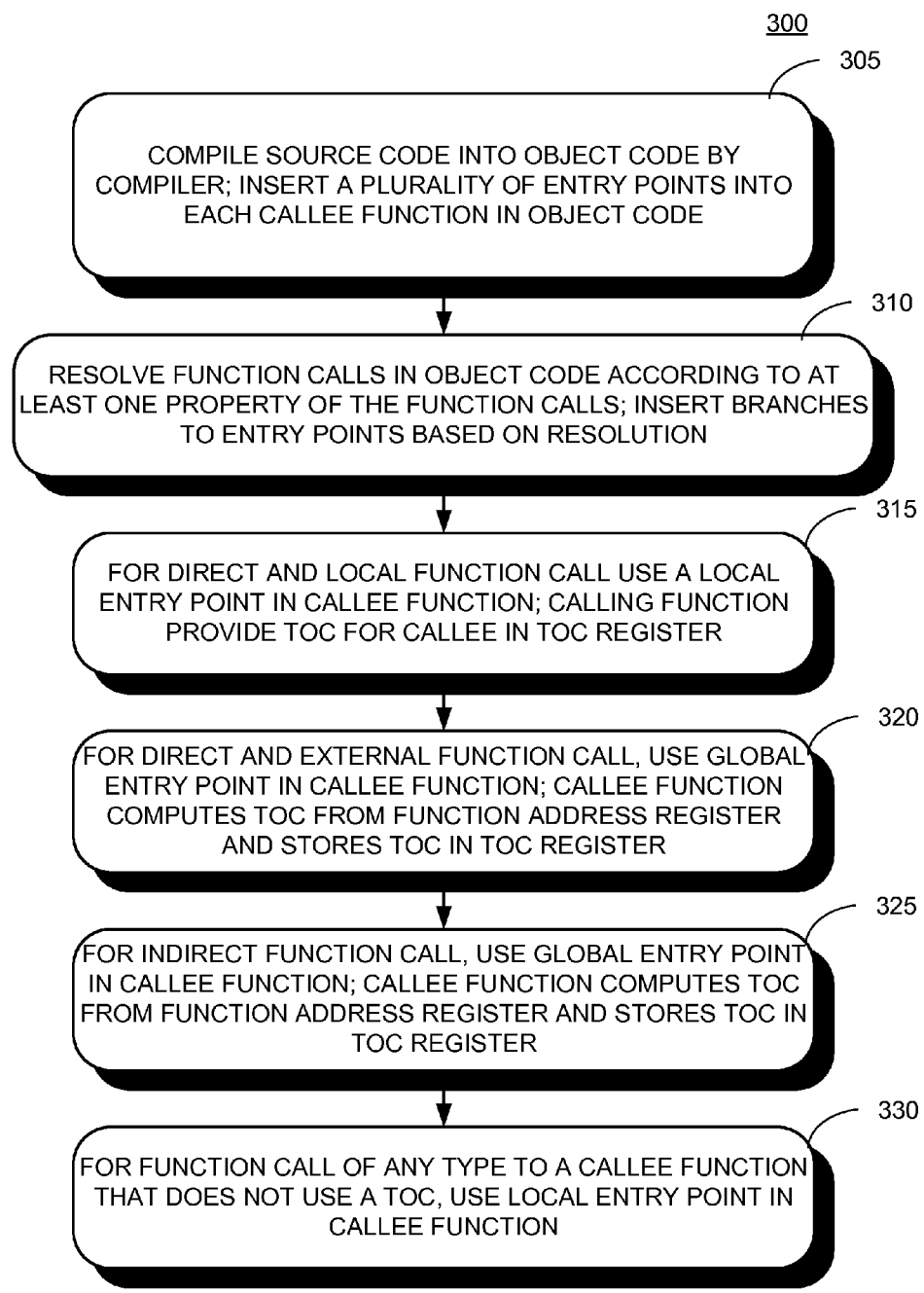
FIG. 3 depicts a process flow for generally resolving a call to a callee function having a plurality of entry points in accordance with an embodiment.

FIG. 3 illustrates an example of a method 300 for selecting one of a plurality of entry points, such as a global entry point and a local entry point, for a callee function in accordance with an embodiment. Although this example refers to a global entry point and a local entry point, a plurality of entry points may be considered as well as entry points defined by other properties besides global or local calls. FIG. 3 is discussed with reference to FIGS. 1 and 2. First, in operation 305, before runtime, a compiler, such as compiler 105, generates application object code 103 (and, in some embodiments, shared library code 104) from program source code (not shown). The compiler that generates application object code 103 (and, in some embodiments, shared library code 104) may be located on another computer system that is distinct from computer system 100. In some embodiments, another compiler on a third distinct computer may generate shared library code 104. During compilation, the compiler 105 may insert multiple entry points and other code. For example, the compiler may insert a global entry point at the beginning of each callee function, followed by prologue code comprising instructions to compute and load the TOC pointer value for the callee function, followed by a local entry point. The main body of a function may be located after its local entry point. It is also indicated in the program source code whether each function call is direct or indirect; a direct function call calls the calling function by name, while an indirect function call references a function pointer.

Figure 4:
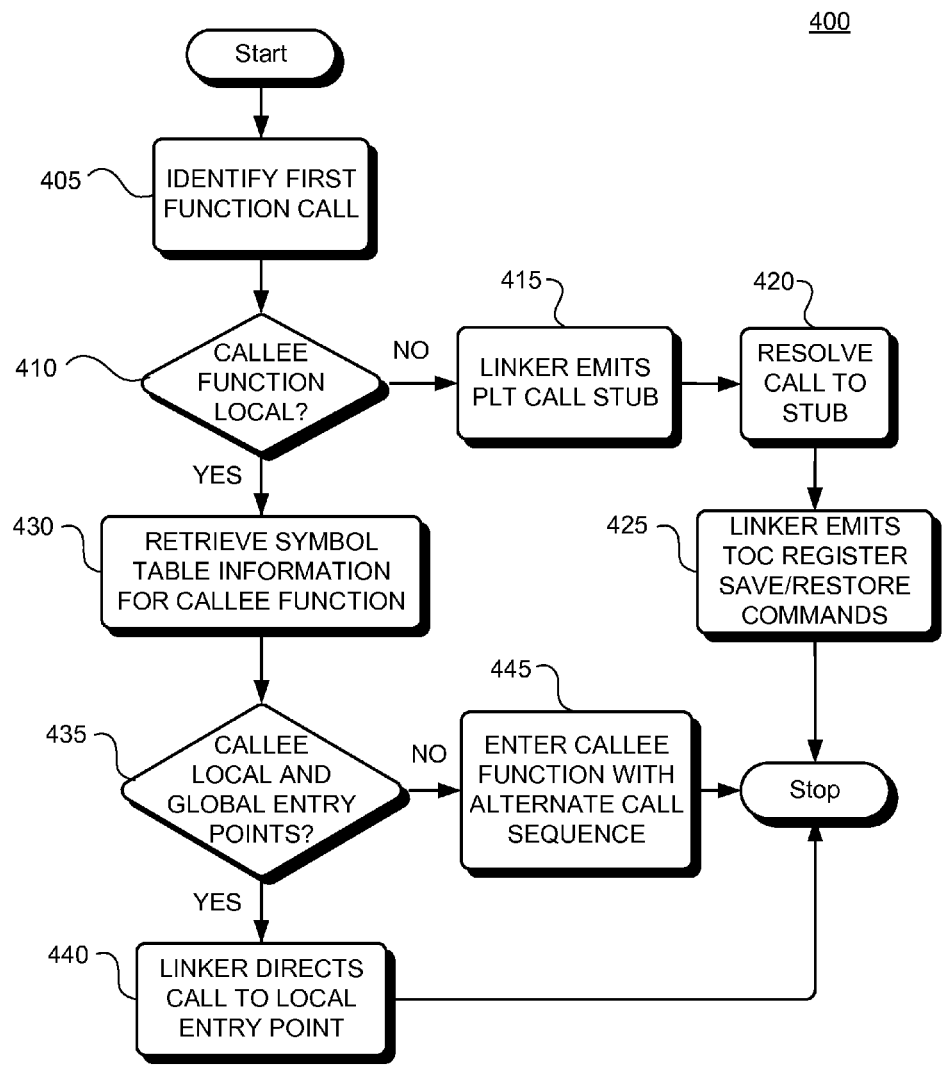
FIG. 4 depicts a process flow for a linker to resolve a call to a callee function having a plurality of entry points in accordance with an embodiment.

Next, in operation 310, the function calls in the calling functions in the application object code 103 are resolved based on at least one property of the function calls (e.g., local or external). The resolving may be performed by compiler 105, linker 106, or loader 107, in various embodiments; resolution may occur at different times for different function calls in the same application object code 103. FIG. 4, discussed below, illustrates a method of resolving, by the static linker 106 at link time, a function call to a callee function with a plurality of entry points. The plurality of entry points may be a global entry point and a local entry point, for example. At the time of resolution of a function call, the compiler 105, linker 106, or loader 107 may insert instructions or an address that cause control to transfer from the function call in the calling function to one of the plurality of entry points of the callee function of the function call, depending on the type of function call (e.g., direct and local, direct and external, or indirect), in addition to other instructions, such as PLT stubs, as needed.

In the example where the plurality entry points of a function are selected based on the at least one property of the function call being local or external, and direct or indirect, operations 315, 320, 325, and 330 may be performed during execution of the application object code 103. For each function call that is encountered during execution of application object code 103, one of operation 315, 320, 325, and 330 is performed. In operation 315, a direct and local function call is executed. For the direct and local function call, the calling and callee functions have the same TOC, which may be provided by the calling function for the callee function in the TOC register 108. Therefore, the function call in the calling function branches to the local entry point in the callee function, skipping the global entry point and the prologue code that includes the callee TOC computation and load instructions. This reduces processor cycles needed to execute the object code.

In operation 320, a direct and external function call is executed. For the direct and external function call, the calling and callee functions may have different TOC values, so the callee function may calculate its TOC pointer value and load the calculated TOC pointer value in the TOC register 108. Therefore, the function call in the calling function branches to the global entry point in the callee function, executes the prologue code to perform TOC pointer value computation, saves the computed TOC pointer value in the TOC register 108, and then proceeds past the local entry point into the body of the callee function.

In operation 325, an indirect function call is executed. For the indirect function call, the TOC pointer value of the callee function may not be known in advance, so the callee function may calculate its TOC pointer value and load the calculated TOC pointer in the TOC register 108. Therefore, the function call in the calling function branches to the global entry point in the callee function, executes the prologue code to perform TOC pointer value computation and loads the computed TOC pointer value in the TOC register 108, and then proceeds past the local entry point into the body of the callee function.

Lastly, in operation 330, a function call to a callee function that does not use a TOC pointer value in the TOC register 108 is executed. In some embodiments, for such a function call, the local entry point in the callee function may be used, regardless of the type of the function call. In further embodiments, the compiler may determine at compile time that the callee function does not use a TOC register for a TOC pointer value, and, based on that determination, omit insertion of the prologue code into the callee function during operation 305.

FIG. 4 depicts a process flow for a linker to resolve a call to a callee function having a plurality of entry points according to various embodiments. Specifically, FIG. 4 illustrates a flow diagram of a method 400 that can be performed by the static linker 106. The method 400 selects one of a plurality of entry points for a function call of a calling function to enter a callee function. After the compiler inserts a plurality of entry points within a plurality of functions of the object code, then the compiler may resolve a function call from a calling function to a callee function. The call may be resolved when the compiler inserts instructions that branch from the function call in the calling function to one of the plurality of entry points of the callee function of the function call at compile time. In various embodiments, the compiler may indicate to a linker to resolve the function call. In various embodiments, the static linker 106 may resolve the function call at link time.

In various embodiments, a combination of the compiler and linker or a linker alone may be able to resolve a function call to a callee function having a plurality of entry points. A static linker, such as static linker 106 may be able to determine an entry point for a call from a calling function to enter a callee function. At link time, an object file is received by the static linker 106. In operation 405, the linker 106 identifies, from a calling function of the object code 103, a first function call to a callee function. The callee function may be part of the application object code 103 as a local function or part of another module such as in the shared library 104 as a global/external function. Generally, calls to external functions may require a TOC pointer value of the calling function to be saved from a TOC register, while calls to local functions may not need a TOC pointer value to be saved since the callee function may share the same TOC pointer value as the calling function. However, in some instances calls to local functions may require a TOC pointer value save as described herein. Similarly, in instances where a TOC save is performed, a TOC restore may also be necessary to restore the saved value.

In operation 410, the static linker 106 may try to determine whether the callee function is a local function. If the static linker 106 cannot determine the callee function is a local function with certainty or the static linker 106 determines that the callee function is a global function, then the method 400 continues to operation 415. In other words, when a symbol cannot be determined to be a local function, the method 400 continues to operation 415. If the linker 106 determines the callee function is a local function, the method 400 continues to operation 430. To make the determination in operation 410, the linker 106 may receive information about the callee function and its function entry points by way of symbol indicators stored in the symbol table 109. The linker 106 may read the symbol indicators by extracting symbol information. The linker 106 may extract symbol information such as, but not limited to, information that indicates the use of the function, TOC register usage, whether multiple entry points are present in the function, and if there are multiple entry points, the distance between a first entry point and a second entry point.

The symbol information may be located in different fields. For example, the symbol table 109 includes TOC register usage indicators that may indicate any functions (local or external) that do not need a TOC pointer value to be stored in TOC register 108, but rather may use TOC register 108 as an application register. In another example, the symbol table 109 includes TOC register usage indicators that may indicate any functions (local or external) that do not need a TOC pointer value to be stored in TOC register 108 and do not use the TOC register. A TOC register usage indicator for a function may comprise a "st_other" field associated with the function in the symbol table 109, and may be a 1-bit field in some embodiments. In further embodiments, the "st_other" field may be any appropriate length, such as a 3-bit field. Likewise, the distance between a first entry point and a second entry point may use the "st_other" field to specify the number of lines of instructions between the two entry points.

In various embodiments, a special relocation may instruct the linker 106 to consider a particular use of a symbol to be local even if otherwise not guaranteed. A recursive function call, i.e. a function calling itself, is an example use of a symbol that is resolved to be local even if other calls to the recursive function may have to be considered global to allow for another module providing a replacement function under the same name. If execution reaches the recursive function in the first place, it was in fact not overridden, and hence a recursive call must also target the same function again.

In various embodiments, the symbol table may have yet other fields that may be used to derive a number of available entry points, register usage, and entry point addresses. In some of these formats, multiple values may be distinctly present as separate entries in the table, or may be represented in an encoded format to reduce storage requirements.

Figure 7:
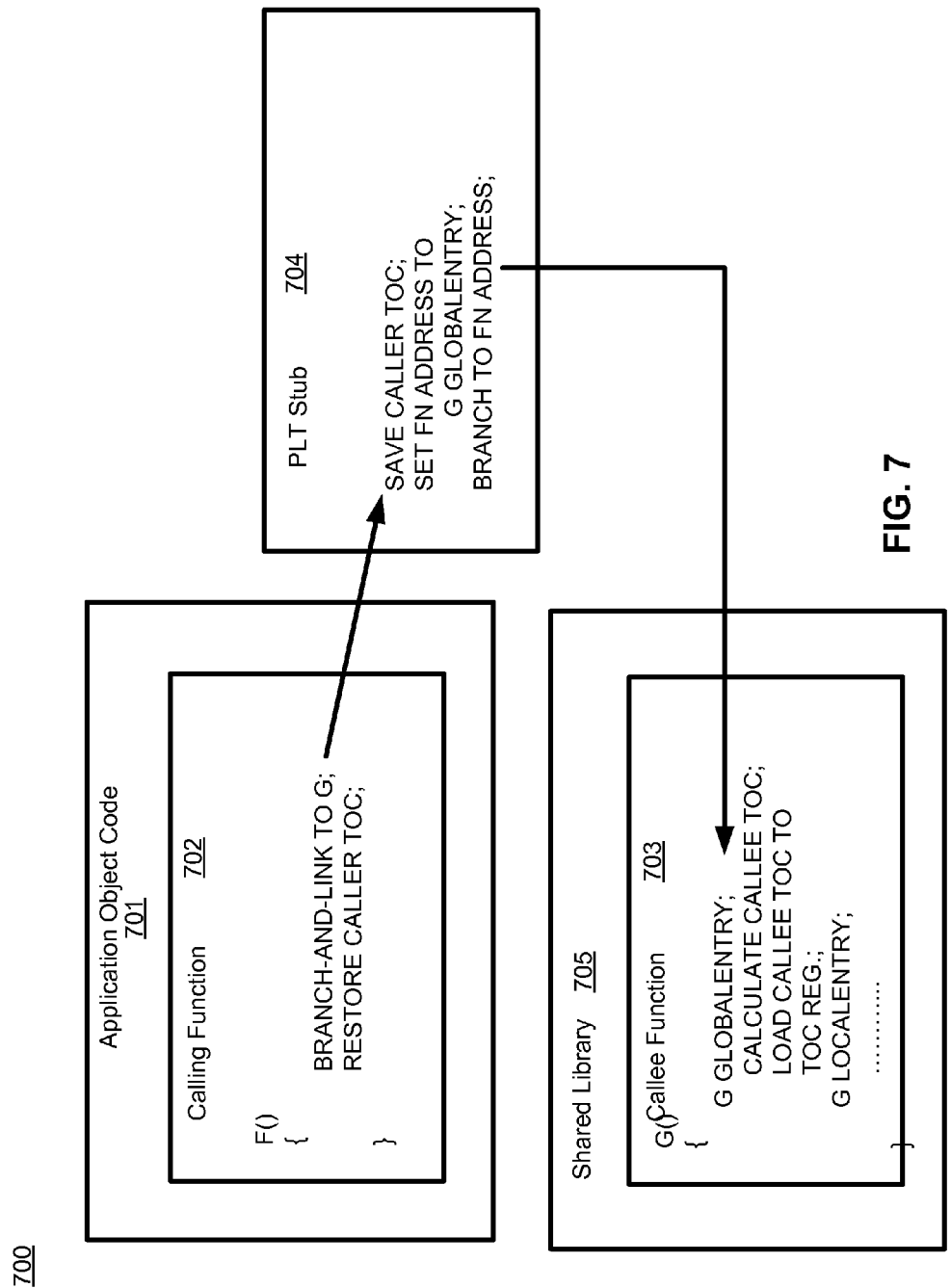
FIG. 7 depicts an example of use of a global entry point as one of a plurality of entry points of a callee function in accordance with an embodiment.

In operation 415, when a callee function cannot be guaranteed to be a local call, or the linker determines the call to be an external call, then the linker may emit a PLT stub and, in operation 420, resolve the call in the calling function to target the PLT stub. The linker 106 may also insert the TOC save/restore commands in operation 425 for saving and restoring the calling function's TOC pointer value that is in the TOC register 108. The TOC restore command may be inserted in a TOC restore placeholder determined by the compiler in the calling function. When no TOC save location is specified the linker may insert the TOC save command in the PLT stub. In various embodiments, the linker may insert the TOC save command in the calling function at or near a TOC save placeholder instruction, i.e., it may precede, replace, or follow the placeholder. The PLT stub also may have instructions for the loader 109 to load a final destination address of the global entry point of the callee function determined by the loader 107 at load time into the function address register 109. The PLT stub may also have instructions for the PLT stub to branch to the global entry point of the callee function by means of the final destination address which is determined by the loader 107 at load time. In the callee function, the prologue code following the global entry point may calculate the callee TOC pointer value and load the callee TOC pointer value in the TOC register before other instructions in the callee function are performed. FIG. 7 herein further describes this process.

If the function call is determined to be a local function call in operation 410, then, in operation 430, the static linker 106 may, in operation 430, retrieve symbol information from the symbol table 109 to determine, in operation 435, whether there are multiple entry points and whether there are local and global entry points. If there is a local entry point, then the method 400 may continue to operation 440. In operation 440, the static linker after determining that the first function call is a local call and that there is a local entry point in the callee function, then the linker 106 may resolve the call to target the local entry point in the callee function. The address of the local entry point may be obtained from the symbol table 109 given by the symbol information. The global entry point and the TOC-related portion of the prologue code may be skipped. The static linker 106 will not need to insert any TOC save/restore commands at TOC save/restore placeholders associated with the function call because the TOC pointer value in the TOC register is shared by the calling function and the callee function. The symbol table 109 can include an indication that a function does not use the TOC register 108. In at least one embodiment, when a function is indicated to not use a TOC register, and does not modify a register holding a TOC value, an entry point may be shared between local and global function calls. When the static linker 106 determines that that a function does not use a TOC register, the static linker 106 may use such an entry point, in at least one embodiment, to perform a local call to the identified local function.

If in operation 435 it is determined that there is only a single entry point or no local entry point, then the linker 106 may resolve the function call to enter the callee function with an alternate call sequence, as depicted in operation 445. In various embodiments, when there is only a global entry point, then the alternate call sequence could be to create a PLT stub as in operation 445 of method 400. In other various embodiments, when additional register save information is present, additional symbols are saved, e.g., using a LM/STM instruction, in a save slot. This requires a suitably allocated storage region, the linker further performing a region check. If no save location is specified, a store is performed using a PLT stub.

In an embodiment, when not enough memory has been allocated to store a plurality of registers, a link abort may occur. In an embodiment, a stub is inserted allocating another stack frame. If this is not possible, e.g., due to parameter passing requiring a parameter overflow area, a linker area is issued. In various embodiments, a separate stack for storing register information can be provided, the stack pointer for the additional helper stack may be maintained in memory, and the helper stack can be transparent to much of the application, except for a non-contiguous LR/callback chain. Tools that unwind the call stack for purposes of exception dispatch or debugging are enhanced to understand helper frames.

In at least one embodiment, the static linker 106 resolves a reference to a function address which is used as a data value, e.g., to initialize a function pointer which may be used for an indirect call. In one embodiment, when the function address is used to initialize a function pointer, and the function is a local function to the module, a global entry point is determined and stored as an initialized value for the function pointer, such that the function pointer may be used to perform indirect calls in the local module, and in external modules. In at least one embodiment, when only a single entry point is present for local and global entries, the single entry point is used. In at least one embodiment, when the initialized value is not available in the present module, the relocation is maintained in the data section to be resolved by the loader 107 or the dynamic linker component of the loader 107, or both, when the module is loaded. In at least one other embodiment, when a function pointer cannot be resolved in the local module, the function pointer is initialized to point to a PLT stub, or another initialization sequence, e.g., in accordance with operation 415.

Regarding the symbol table 109, in an embodiment, the symbol table may have an indicator that may correspond to a first entry point, which may be, for example, a global entry point. An offset corresponding to the second entry point may be a stored along with the symbol, which may be, for example, a local entry point. In various embodiments, the offset between the first and the second entry points may be stored in another area of the object file (e.g., as part of a text, a data, and an extended section). In various embodiments, multiple symbols may be available corresponding to the plurality of entry points for the same function. Other symbol information may be provided with each symbol.

In one particular embodiment, the symbol table contains the address of the global entry point, and a field in the symbol table, such as, for example, "st_other" which is used to encode the distance of a local entry point from a global entry point. In accordance with one such embodiment, the code corresponding to a global entry point loads the TOC pointer value. In accordance with one embodiment, the TOC pointer value is loaded by adding a known distance from the global entry point of the function to the value of said entry point, e.g., when it is stored in a register, such as in function address register 110, (i.e. register r12).

Thus, in various embodiments, the code for a function g contains the following, assuming the function entry point is in r12 when the global entry point is called, and r2 contains a shared TOC pointer value when the local entry point is shared:

g_global_entry:
    addis r2, r12, (.TOC.-g_global_entry)@ha
    addi r2, r2 (.TOC.-g_global_entry)@l
g_local_entry:
    ...
    blr In accordance with various embodiments, when a function returns after being called via a local entry point, the value of the TOC register (e.g., in r2 in the specific example) which is shared with the caller is unchanged, and the callee does not need to restore the value in r2. When a function returns after being called via a global entry point, the value of the TOC register, (e.g., in r2 in the specific example) which is not shared with the caller, has been changed, and the caller needs to restore the TOC pointer value in the TOC register to the saved value to obtain its own TOC for use to establish addressability to the caller's data. In accordance with an embodiment, the symbol table 109 stores the addresses for g_global_entry and g_local_entry addresses in conjunction with the symbol for function g( ). In accordance with various embodiment, the symbol table 109 stores the address of g_global_entry in the symbol table and indicates a distance of two instructions to a local entry point. In various embodiments, the distance is directly stored. In various embodiments, the distance is encoded, e.g., using the st_other field. In various embodiments, a distance of two instructions corresponds to a value of st_other=3. In accordance with various embodiments, "st_other" can encode a variety of distances and other information, such as register usage of general purpose or other registers, the number and types of entry points, whether a function requires a function register to be initialized upon entry to a particular entry point (e.g., a global entry point), whether a TOC register is required to be initialized, whether a TOC register will be modified, whether a TOC register is required to be saved, whether a TOC register is available for use by a static linker in assembling PLT stub sequences, and so forth.

Figure 5:
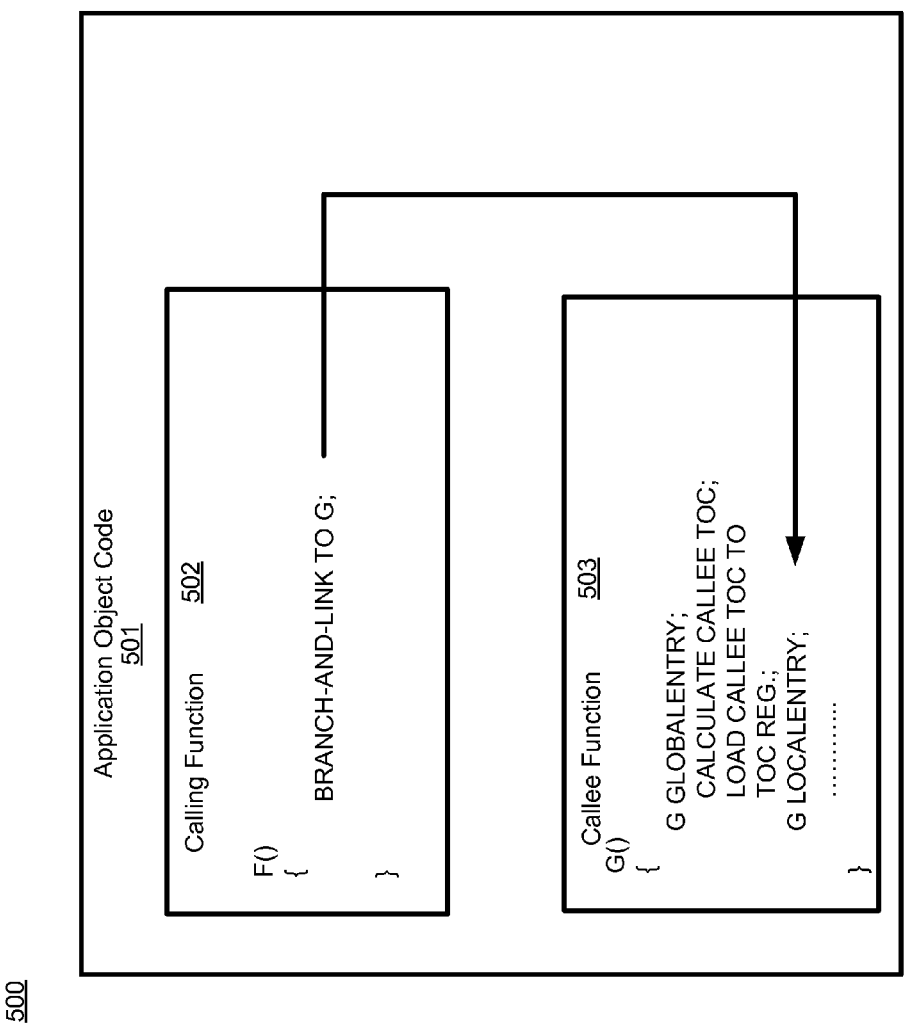
FIG. 5 depicts an example of use of a local entry point determined by a compiler for a local and direct function call in accordance with an embodiment.
Figure 6:
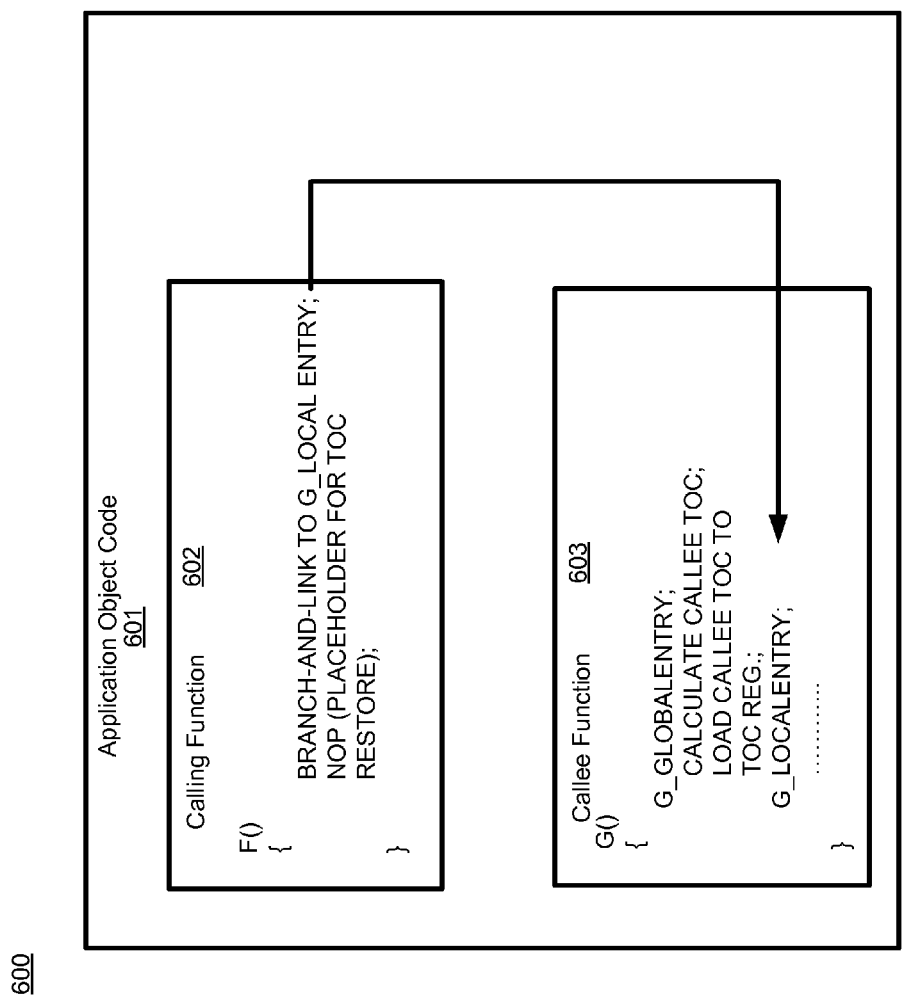
FIG. 6 depicts an example of use of a local entry point determined by a static linker for a local and direct function in accordance with an embodiment.

In at least one embodiment, a number of commands are available to a compiler to create and initialize symbol entry fields, for example, a compiler or assembler programmer may indicate the presence of a local entry point and its distance using a .localentry command:

g:
0: addis r2,r12,.TOC.-0b@ha
    addi r2,r2,.TOC.-0b@l
g_local:
    .localentry g,g_local-g
    ...
    blr FIGS. 5 and 6 illustrate examples of use of a local entry point for a local and direct function call; in FIGS. 5 and 6, resolution of the function call occurs at compile time and at link time, respectively. In each of FIGS. 5 and 6, the calling function and the callee function have the same TOC, and the TOC is provided for the callee function by the calling function in the TOC register 108.

In example 500 of FIG. 5, resolution that the function call from calling function F( ) 502 to callee function G( ) 503 is a local function call (i.e., F( ) and G( ) are both in application object code 501) occurs during compile time. The function call from calling function F( ) 502 to callee function G( ) 503 is also determined to be a direct function call because G( ) is called in F( ) by name. Therefore, the compiler 105 inserts a direct branch to the local entry point in callee function G( ) 503 into calling function F( ) during compilation. For the function call from F( ) to G( ), the global entry point in function G( ) 503, and the prologue code that performs computation of the TOC value and initialization of the TOC register for function G( ) 503, are skipped. The compiler may be able to make the determination that the call is local for example because G( ) is defined in the same source file as a static routine that cannot be overridden from another module. The compiler may also be able to make the determination that this particular call may be treated as local, e.g. because it is a recursive call. In some cases (e.g. if G( ) is a static routine), the linker will likewise be able to make the same determination, so the compiler can simply assume the linker will take appropriate action. In other cases (e.g. recursive calls), the compiler will have to convey the fact that this call can be local to the linker, e.g. by using a special relocation type.

In example 600 of FIG. 6, resolution that the function call from calling function F( ) 602 to callee function G( ) 603 is a local function call (i.e., F( ) and G( ) are both in application object code 601) occurs during link time. The function call from calling function F( ) 602 to callee function G( ) 603 is also determined to be a direct function call because G( ) is called in F( ) by name. Therefore, the static linker 106, when it resolves the function call, replaces a symbol for the function in the function call (i.e., a symbol in the "Branch-and-Link to G" in function F( )) with an address of the local entry point to the callee function G( ) 603 during link time. The NOP instruction in the calling function 602 serves as a place holder for TOC restore instructions. In the embodiment depicted in FIG. 6, the static linker 106 does not insert TOC save/restore instructions into the TOC save/restore placeholder instructions inserted by the compiler for saving TOC pointer value from a TOC register. For the function call from F( ) to G( ), the global entry point in G( ) 603, and the prologue code that performs computation of the TOC value and initialization of the TOC register for G( ) 603, are skipped.

FIG. 7 illustrates an example of use of a global entry point for an external and direct function call. In example 700 of FIG. 7, resolution that the function call from calling function F( ) 702 to callee function G( ) 703 is an external function call (i.e., F( ) and G( ) are in the different respective modules, e.g., application object code 701 and shared library 705) occurs during link and load times. The function call from calling function F( ) 702 to callee function G( ) 703 is also determined to be a direct function call because G( ) is called in F( ) by name. Therefore, at link time, the static linker 106 generates a PLT stub 704 and replaces a symbol for the function G( ) in the first function call of the calling function F( ) 702 with an address of the PLT stub 704. The PLT stub 704, when executed, stores the TOC of the calling function F( ) 702 in the stack frame associated with F( ) in the runtime stack, loads a final destination address to be determined by the loader 107 at load time into the function address register 109, and then branches to the address in the function address register 109. In this example, the loader 107 determines that the address of the global entry point in callee function G( ) 703 should be used. The loader 107 may add this address to the PLT stub 704. The static linker 106 also inserts code (i.e., "Restore Caller TOC" replaces a NOP (not shown)) into the calling function F( ) to restore its TOC from the stack frame associated with F( ) in the runtime stack after the call to G( ) has returned to F( ). After entering callee function G( ) 703 at the global entry point, the prologue code performs calculation of the TOC for callee function G( ) 703 and storing of the calculated TOC into the TOC register 108 before proceeding with execution of the callee function G( ) 703. The TOC for the callee function G( ) 703 may be calculated based on adding an offset value to the value that is stored in the function address register 109.

Technical effects and benefits include reduction in unnecessary TOC pointer value calculation and load operations during execution of application object code.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product for a static linker to resolve a function call, the computer program product comprising a computer readable storage medium having program instructions embodied therewith, the program instructions readable by a computer processor to cause the computer processor to:
   identify, during link time, a first function call of a calling function to a callee function;
   determine whether the callee function is a local function;
   in response to determining that the callee function is a local function, determine whether the callee function has a plurality of entry points and whether an entry point of the plurality of entry points is a local entry point, the determining of whether the callee function has a plurality of entry points and whether an entry point of the plurality of entry points is a local entry point including accessing symbol information from a symbol table, the symbol table indicating a number of entry points and whether an entry point is a local entry point; and
   resolve, during link time, the first function call to enter the local entry point when it is determined that the callee function has a plurality of entry points and an entry point of the plurality of entry points is the local entry point, wherein the resolving of the first function call to enter the local entry point includes replacing a symbol for the callee function in the first function call with an address of the local entry point during link time.

2. The computer program product of claim 1, further comprising:
   in response to determining that the callee function cannot be determined to be a local function, generate a stub code by the static linker during link time;
   direct, during link time, the first function call to enter the stub code,
   wherein the directing the first function call to enter the stub code includes replacing a symbol for the callee function in the first function call with an address of the stub code.

3. A computer system comprising:
   a memory to store a static linker, a first module, and a second module; and
   a processor, communicatively coupled to the memory, the computer system configured to:
   identify, during link time, a first function call of a calling function to a callee function;
   determine whether the callee function is a local function;
   in response to determining that the callee function is a local function, determine whether the callee function has a plurality of entry points and whether an entry point of the plurality of entry points is a local entry point, the determining of whether the callee function has a plurality of entry points and whether an entry point of the plurality of entry points is a local entry point including accessing symbol information from a symbol table, the symbol table indicating a number of entry points and whether an entry point is a local entry point; and
   resolve, during link time, the first function call to enter the local entry point when it is determined that the callee function has a plurality of entry points and an entry point of the plurality of entry points is the local entry point, wherein the resolving of the first function call to enter the local entry point includes replacing a symbol for the callee function in the first function call with an address of the local entry point during link time.

4. The computer system of claim 3, further comprising:
   in response to determining that the callee function cannot be determined to be a local function, generating a stub code by the static linker during link time; and
   directing, during link time, the first function call to enter the stub code,
   wherein the directing the first function call to enter the stub code includes replacing a symbol for the callee function in the first function call with an address of the stub code.

5. The computer system of claim 4, further comprising:
   inserting a table of contents ("TOC") save command for a TOC pointer value in one of the stub code or a TOC save placeholder instruction of the calling function; and
   inserting a TOC restore command in a TOC restore placeholder instruction after the first function call in the calling function.

6. The computer system of claim 3, further comprising:
   in response to determining that the callee function cannot be determined to be a local function,
   determining that the callee function does not require a table of contents ("TOC") pointer value; and
   resolving, during link time, the first function call to enter the callee function.

7. The computer system of claim 6, wherein the callee function is a recursive function.

8. The computer system of claim 3, further comprising:
   inserting an alternate call sequence when the callee function does not have a plurality of entry points.

9. The computer system of claim 3, wherein the resolving of the first function call to enter the local entry point includes:
   retrieving symbol information from a symbol table, the symbol table having symbol information that includes an address of a global entry point and an offset from the global entry point to the local entry point; and adding the offset to the global entry point to obtain the address of the local entry point.

\* \* \* \* \*